(12) United States Patent
Hampton et al.

(10) Patent No.: US 10,037,087 B2
(45) Date of Patent: Jul. 31, 2018

(54) LOW PROFILE INFORMATION HANDLING SYSTEM KEYBOARD

(71) Applicant: Dell Products L.P., Round Rock, TX (US)

(72) Inventors: Patrick A. Hampton, Round Rock, TX (US); Richard W. Schuckle, Austin, TX (US); Jace W. Files, Round Rock, TX (US); John T. Morrison, Round Rock, TX (US); Vinh X. Bui, Round Rock, TX (US); Chiu Jung Tsen, Hsinchu (TW); Gerald R. Pelissier, Mendham, NJ (US); Wen-Pin Huang, New Taipei (TW)

(73) Assignee: DELL PRODUCTS L.P., Round Rock, TX (US)

( * ) Notice: Subject to any disclaimer, the term of this patent is extended or adjusted under 35 U.S.C. 154(b) by 227 days.

(21) Appl. No.: 14/926,185

(22) Filed: Oct. 29, 2015

(65) Prior Publication Data

US 2017/0123508 A1    May 4, 2017

(51) Int. Cl.
  *G06F 3/02*   (2006.01)
  *G06F 1/16*   (2006.01)

(52) U.S. Cl.
  CPC .......... *G06F 3/0221* (2013.01); *G06F 1/1624* (2013.01); *G06F 1/1666* (2013.01)

(58) Field of Classification Search
  CPC .................................................... G06F 3/0216
  See application file for complete search history.

(56) References Cited

U.S. PATENT DOCUMENTS

| | | | | |
|---|---|---|---|---|
| 5,269,004 A | * | 12/1993 | Comerford | G06F 3/0213 341/22 |
| 5,587,875 A | * | 12/1996 | Sellers | G06F 1/1616 200/344 |
| 5,748,114 A | * | 5/1998 | Koehn | G06F 3/0202 200/5 A |
| 2001/0033269 A1 | * | 10/2001 | Hosoya | G06F 1/1616 345/168 |
| 2004/0136637 A1 | * | 7/2004 | Verweg | H03K 17/969 385/12 |
| 2009/0128495 A1 | * | 5/2009 | Kong | G02B 6/0033 345/170 |
| 2016/0179212 A1 | * | 6/2016 | Toraille | G06F 3/0202 345/170 |

* cited by examiner

*Primary Examiner* — Chad Dicke
(74) *Attorney, Agent, or Firm* — Zagorin Cave LLP; Robert W. Holland

(57) ABSTRACT

A portable information handling system keyboard retracts from an extended position to a retracted position, the retracted position bring the keys into the portable information handling system housing to provide a compressed closed position of the housing. The keyboard keys are biased to the extended position with a metal dome that interacts with a scissor support structure.

7 Claims, 9 Drawing Sheets

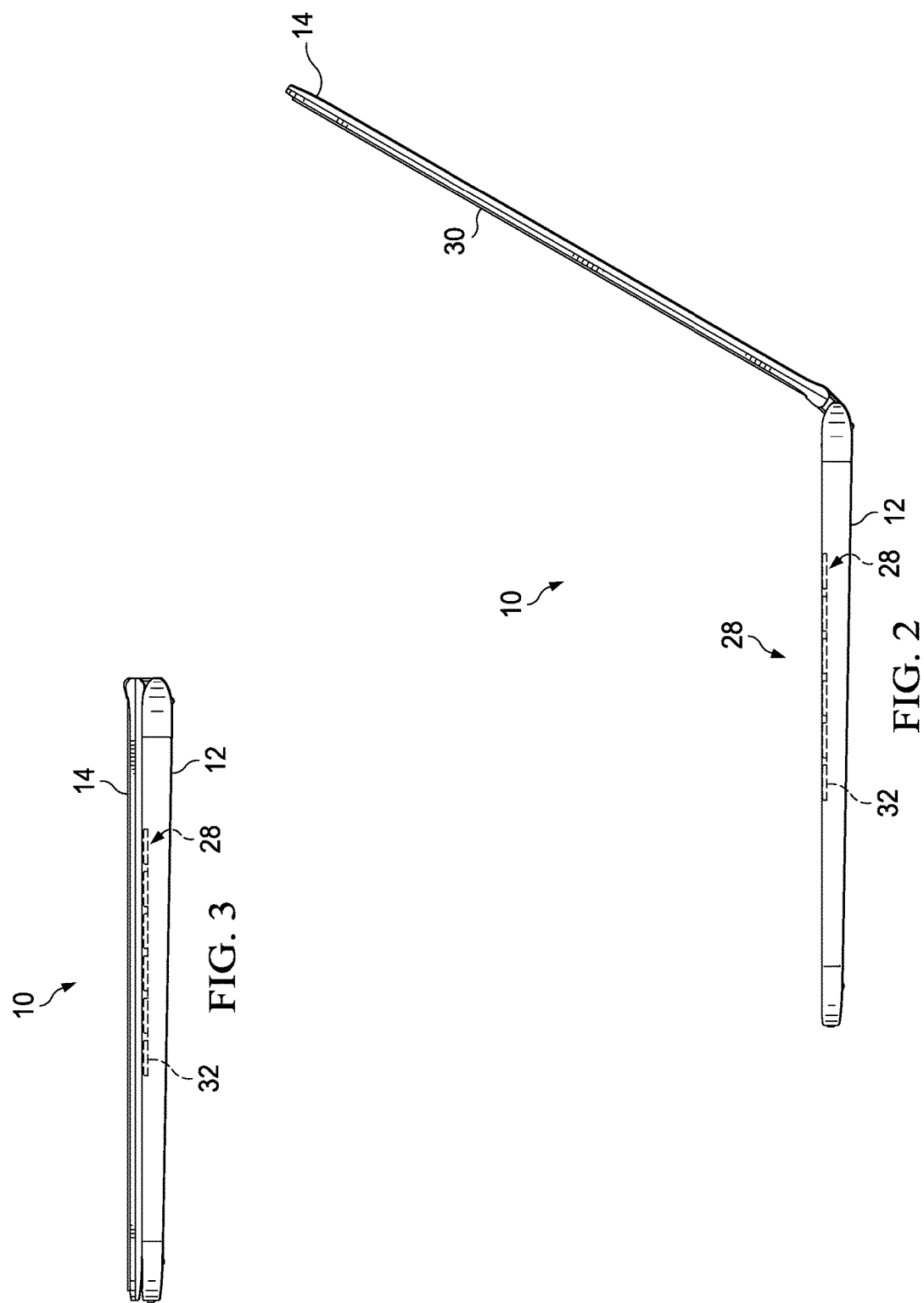

LOW PROFILE INFORMATION HANDLING SYSTEM KEYBOARD

BACKGROUND OF THE INVENTION

Field of the Invention

The present invention relates in general to the field of information handling system touch input management, and more particularly to an information handling system low latency touch rejection buffer.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically have integrated input/output (I/O) devices and power sources that support end user interactions free from hardwired connections for peripheral devices and power. For example, a typical portable information handling system includes an integrated display that presents information as visual images and often has a touchscreen to accept touch inputs, such as at a displayed keyboard. In some instances, portable information handling systems include integrated keyboards that accept keyed inputs. Generally, integrated keyboards increase the size of the portable information handling system due to the height used to allow key travel. End users will typically accept increased height for portable information handling systems that are used to perform input-intensive tasks, such as word processing and email. If end users do not have input-intensive tasks, then end users will instead typically prefer tablet-type information handling systems that use a touchscreen keyboard. Tablet information handling systems typically have a thinner profile since tablets do not include integrated keyboards.

One difficulty faced by information handling system manufacturers of portable information handling systems is that integrated keyboards typically have a minimal height associated with key movement. In part, this minimal height is driven by standards for key movements. End users tend to rely upon key movement as feedback for when an input has been made at a keyboard with a minimal key movement described for standardized keyboards. Although keyboard height may be reduced by reducing key vertical travel, end users tend to have some degraded user experience when interacting with such reduced vertical key travel distances. One solution that allows reduced vertical height of the keyboard while maintaining key vertical travel distance is to retract keyboard keys when the information handling system is stored and extend the keyboard keys when the information handling system is in use. For example, as a convertible information handling system lid closes over the top of a keyboard, the force of the rotation of the lid relative to the main housing is translated into a retraction of the keys into the main housing. When extended, such keys provide a normal range of motion to accept end user inputs; however, when retracted such keys have reduced height to allow a more thin storage configuration for the information handling system.

Retraction of full-movement keys when the information handling system is stored typically introduces additional force to the closing operation that translates into key retraction. For example, full-movement keyboards typically include a rubber dome or other device that biases keys to an upwards position. Retraction of all keys during closing of an information handling system generally needs sufficient force to overcome the biasing devices for all keys of the keyboard. Further, sustained retraction of the keys tends to wear down the biasing devices so that they become less effective over time. For example, sustained compression of rubber domes under keys tends to breakdown the rubber dome material over time, thus changing the "feel" of the keyboard keys and, in some instances, resulting in increased risk of false input detections as keys move under too little pressure. Generally, rubber dome biasing devices provide end users with an expected feedback due to the wide adoption of rubber domes by keyboard manufacturers.

Another difficulty associated with sustained retraction of keyboard keys is that the retracted position tends to place pressure on the key input detection device. Conventional keyboards generally use a membrane material that detects key presses by detecting current at the location of a key press due to a contact made with pressure applied by the membrane. Sustained pressure on the membrane tends to stretch and wear the membrane material resulting in failure over time. As membrane material wears, input detections become unreliable.

SUMMARY OF THE INVENTION

Therefore, a need has arisen for a system and method which provides an information handling system keyboard having retractable keys with adjustable biasing force.

A further need exists for a system and method which provide an information handling system keyboard having key input detection that supports key retraction with reduced wear.

In accordance with the present invention, a system and method are provided which substantially reduce the disadvantages and problems associated with previous methods and systems for reducing keyboard key heights. Keyboard keys biased away from an input detection sensor have a biasing device disabled to retract keys into a portable information handling system housing for storage. The biasing device and/or input detection sensor surface avoid or reduce the use conventional flexible membrane and rubber dome materials that deteriorate over time.

More specifically, a portable information handling system has processing components disposed in a housing that process information, such as a CPU, memory, chipset and related firmware, and keyboard controller. A keyboard integrated in the housing accepts end user inputs at keys that travel vertically and provide the keyboard inputs to the CPU for processing, such as with BIOS firmware instructions executing on the keyboard controller. A biasing device biases the keys out of the housing and away from an input detection sensor. The portable information handling system selectively configures into a storage mode with all of the keyboard keys retracted into the housing in a stored position. In one embodiment, to reduce the force needed to retract all keys into a stored position, the biasing devices have the upwards key bias removed, such as by sliding the biasing device relative to a key support structure. For example, a metal dome disposed on a flexible membrane surface slides with the flexible membrane surface relative to a key support structure pressure point so that misalignment of the metal dome and pressure point remove upward bias from the key. In another embodiment, the flexible membrane surface is replaced with a rigid input detection surface that does not deteriorate over time when keys are retracted into a stored position, such as light emissive technology touch surface or a magnet and Hall sensor arrangement that detects inputs without compression of a membrane.

The present invention provides a number of important technical advantages. One example of an important technical advantage is that information handling system keyboards have improved durability when placed in a storage configuration over extended time periods. For example, removing keyboard bias to aid storage of keyboard keys in a retracted position removes the pressure of an input at an input sensor for the retracted keys so that the input sensor does not deteriorate over time, such as may happen with a flexible membrane subjected to an extended input by a key. In the example embodiment, using a metal dome as a biasing device instead of a rubber dome decreases the size of the biasing device and allows motion of the biasing device relative to a key pressure point to selectively remove upward bias provided to a key. In an alternative embodiment, a rigid input detection sensor surface detects key inputs instead of a flexible member, such as with a light emissive technology touch sensor or a magnet and Hall switch arrangement, so that force provided from a continuing input does not degrade the touch sensor operation over time. In other alternative embodiments, various combinations of movable biasing devices and rigid input detection sensor surfaces may be used to enhance keyboard durability as desired.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts a side view of the portable information handling system having keyboard keys extended with the lid housing portion open relative to the main housing portion;

FIG. 3 depicts a side view of the portable information handling system having keyboard keys retracted with the lid housing portion closed relative to the main housing portion;

DETAILED DESCRIPTION

Portable information handling system keyboard keys retract into a storage position by removing the upward bias of a key biasing device to aid key retraction. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
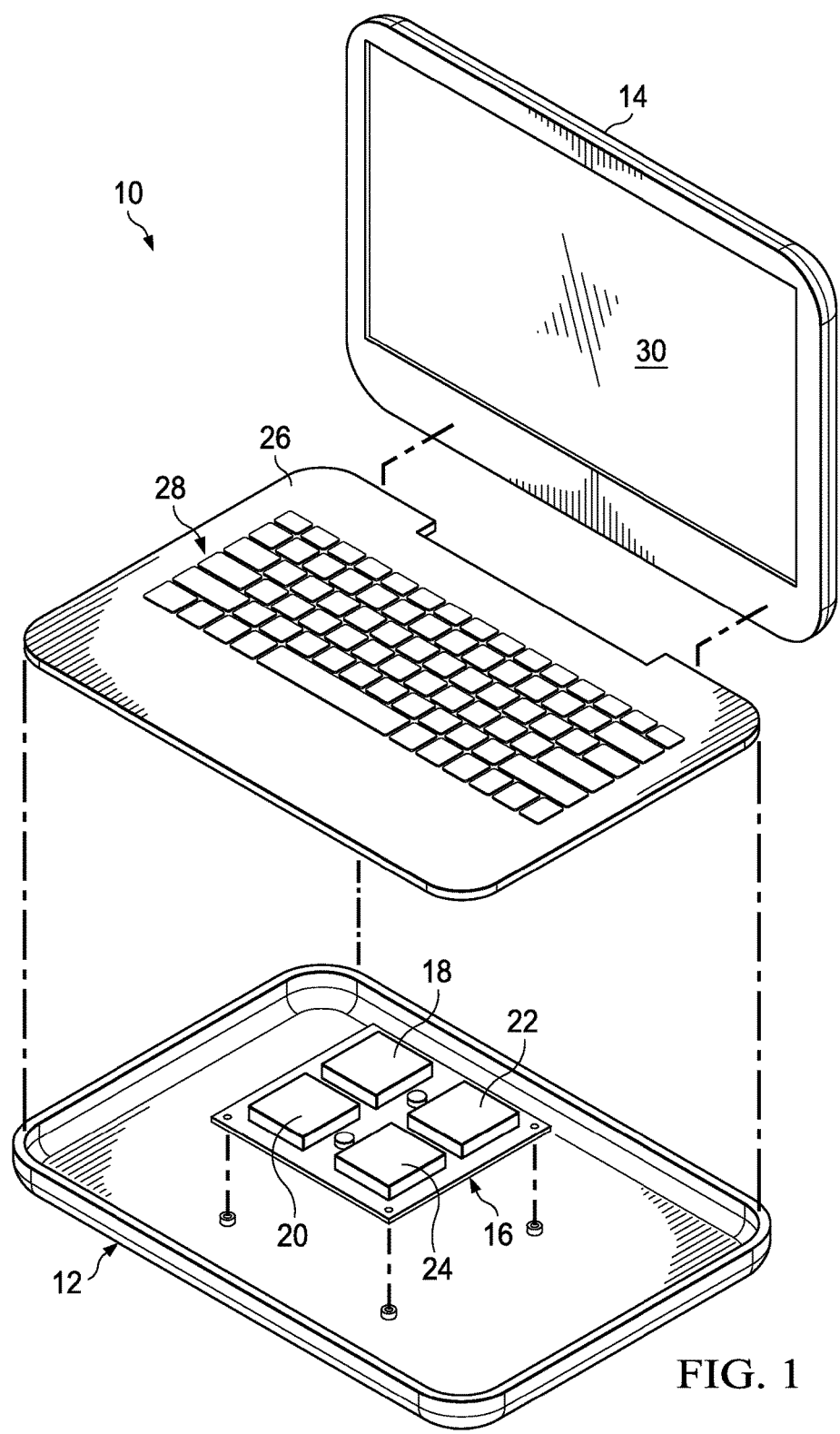
FIG. 1 depicts a blown-up view of a portable information handling system having retractable keyboard keys.

Referring now to FIG. 1, a blown-up view depicts a portable information handling system 10 having retractable keyboard keys. In the example embodiment, portable information handling system 10 has a main housing portion 12 rotationally coupled with a lid housing portion 14 so that the housing portions rotate between a closed position and one or more open positions, such as a clamshell position having approximately 90 degrees of relative rotation or a tablet position having approximately 360 degrees of relative rotation. Main housing portion 12 contains processing components that cooperate to process information, such as a motherboard 16 that physically supports and interfaces a CPU 18, memory 20, keyboard controller (KBC) 22 (also commonly referred to as an embedded controller) and a chipset 24. A housing main portion cover 26 covers the processing components in part with an integrated keyboard 28 that communicates end user inputs to keyboard controller 22. A display 30 integrated in lid housing portion 14 presents information as visual images, such as in response to visual information sent from a graphics processor within chipset 24. In alternative embodiments, other types of physical configurations of housing and processing components may be used. For example, processing components 18-24 may be disposed in housing lid portion 14 in a tablet configuration with keyboard 28 supported in a housing main portion 12 that acts as a display stand with an integrated keyboard. As another example, keyboard 28 may be a peripheral device separate from information handling system 10 that includes retractable keys for a lower profile storage state.

Referring now to FIG. 2, a side view depicts portable information handling system 10 having keyboard 28 keys 32 extended with the lid housing portion 14 open relative to the main housing portion 12. The configuration depicted by FIG. 2 is commonly referred to as a clamshell configuration in which the lid portion 14 rotates approximately 90 degrees relative to the main portion 12 so that keyboard 28 is exposed to accept end user inputs at keys 32 and display 30 is raised into a viewing position. Keys 32 extend upwards and out of information handling system 10 with a biasing force that an end user overcomes by pressing on a key to make an input, thereby depressing the key 32 into information handling system 10. Various standards compliance requirements define the amount of vertical motion that a key 32 should have to accept an input.

Figure 4:
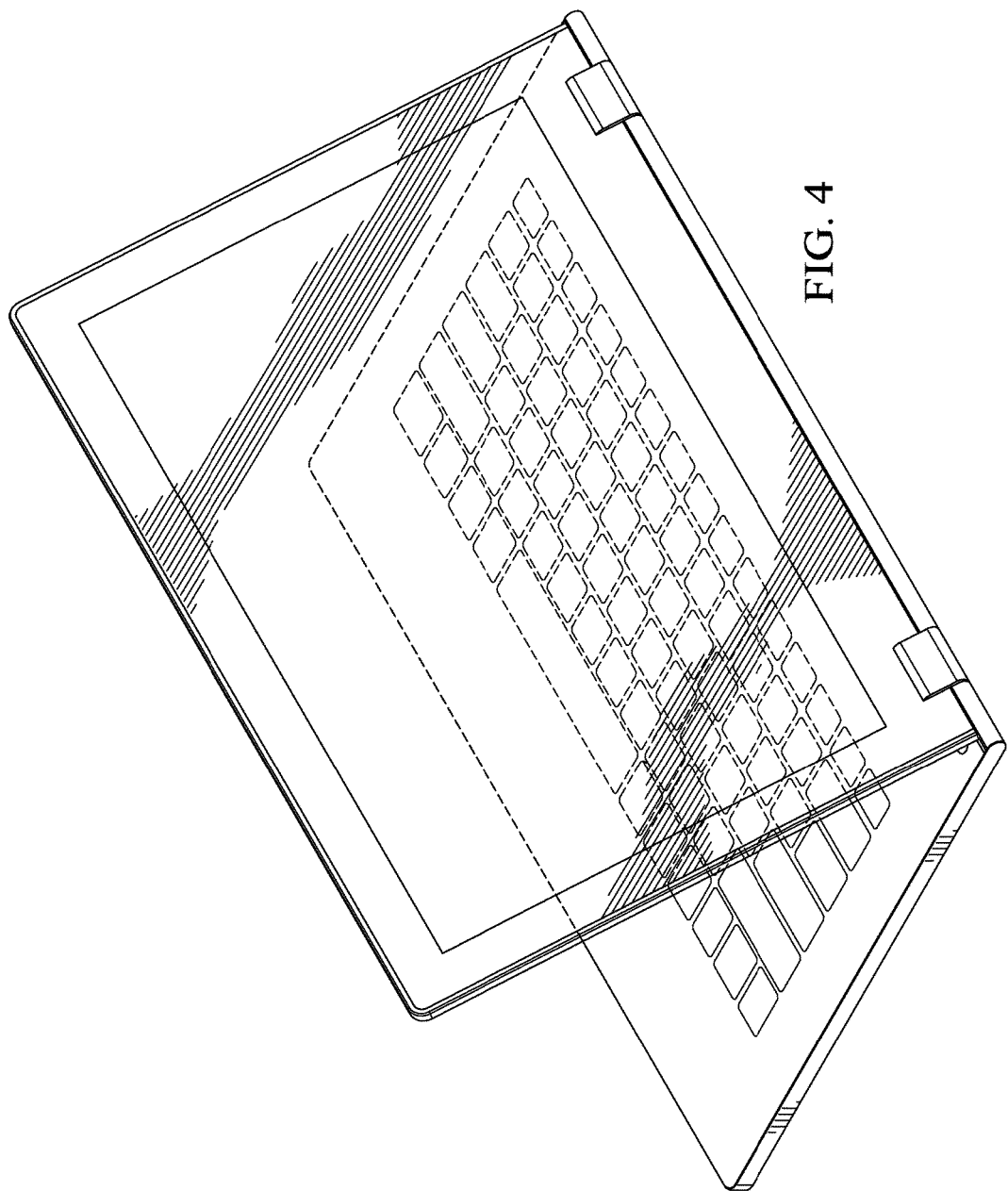
FIG. 4 depicts a side perspective view of the portable information handling system having keyboard keys retracted with the lid housing portion opened to a tablet viewing position having the main housing portion supporting the lid housing portion with the keyboard resting on a support surface.
Figure 5:
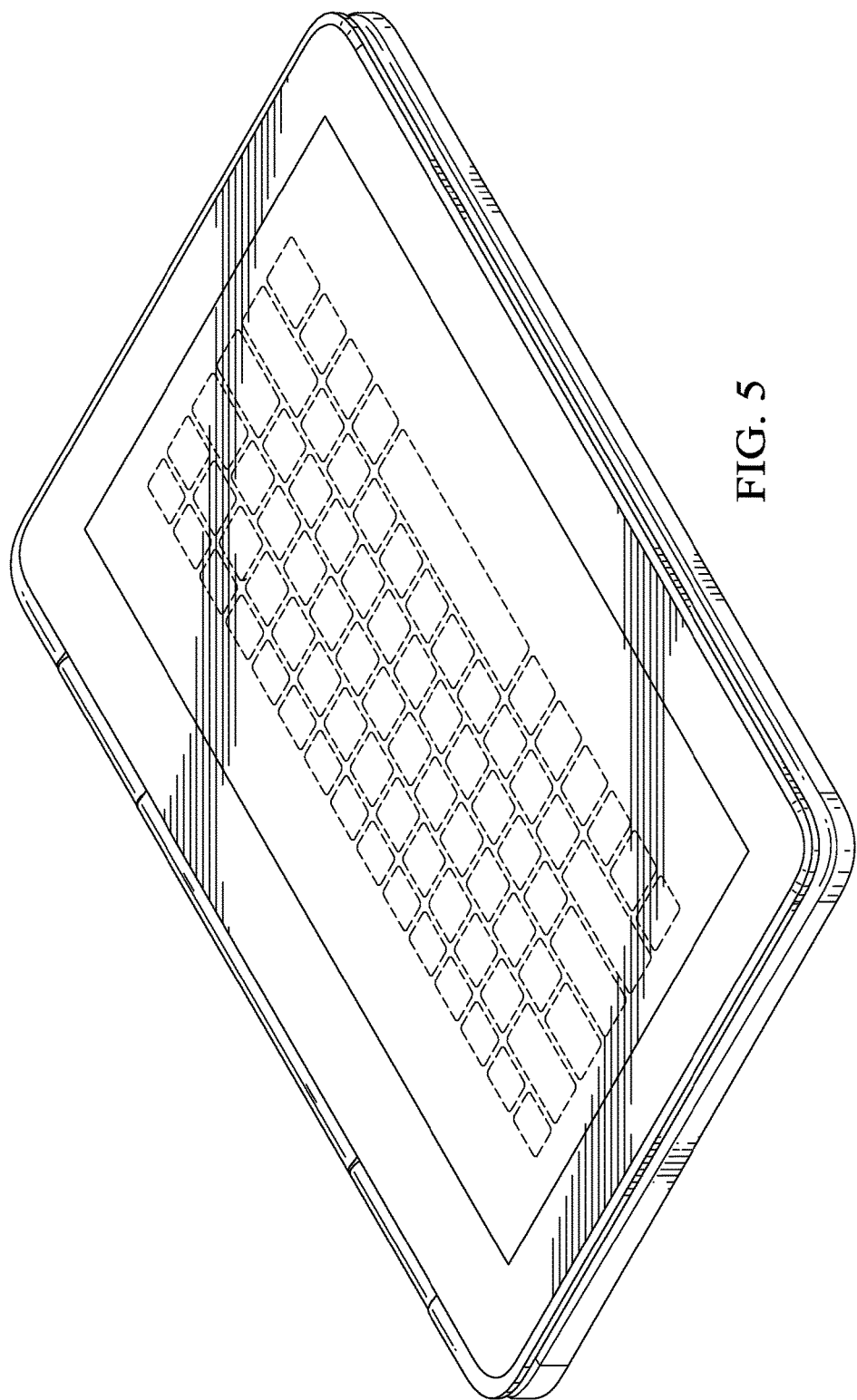
FIG. 5 depicts a side perspective view of the portable information handling system having keyboard keys retracted with the lid housing portion rotated 360 degrees to a tablet configuration having the keyboard resting on a support surface.

Referring now to FIG. 3, a side view depicts portable information handling system 10 having keyboard 28 keys 32 retracted with the lid housing portion 14 closed relative to the main housing portion 12. Forcing keys 32 to depress to an input position reduces the vertical housing size needed to bring the housing portions to a closed position with housing lid portion 14 closed over the top of housing main portion 12. In the example embodiment, key biasing to an outward position is removed so that closing the housing portions relative to each other has a reduced compression force relative to the compression force felt if all keys were biased outward during closing of the housing portions. In addition, removing the key outward bias when keys 32 are retracted also reduces wear felt by any flexible materials used within keyboard 28, such as a flexible membrane used to detect end user inputs. FIG. 4 depicts a side perspective view of the portable information handling system having keyboard keys retracted with the lid housing portion opened to a tablet viewing position having the main housing portion supporting the lid housing portion with the keyboard resting on a support surface. FIG. 5 depicts a side perspective view of the portable information handling system having keyboard keys retracted with the lid housing portion rotated 360 degrees to a tablet configuration having the keyboard resting on a support surface. The retraction of the keys may be tied to rotation of the lid and main housing portions relative to each other, may be manually set, may be based on a weight sensor disposed proximate the keyboard or on a simultaneous pressing down of all or a predetermined number of keys that triggers retraction.

Figure 6A:
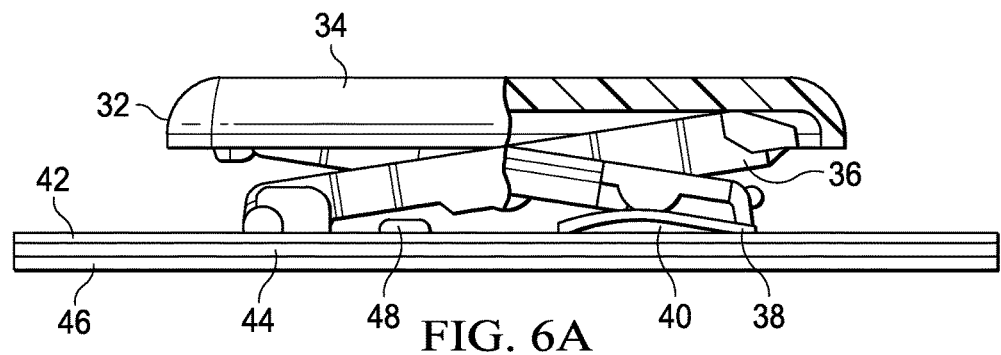
FIGS. 6A through 6E depict a side view of a keyboard key collapsing from an extended position biased upwards by a biasing device to a retracted position having the biasing device slid relative to the key.
Figure 6B:
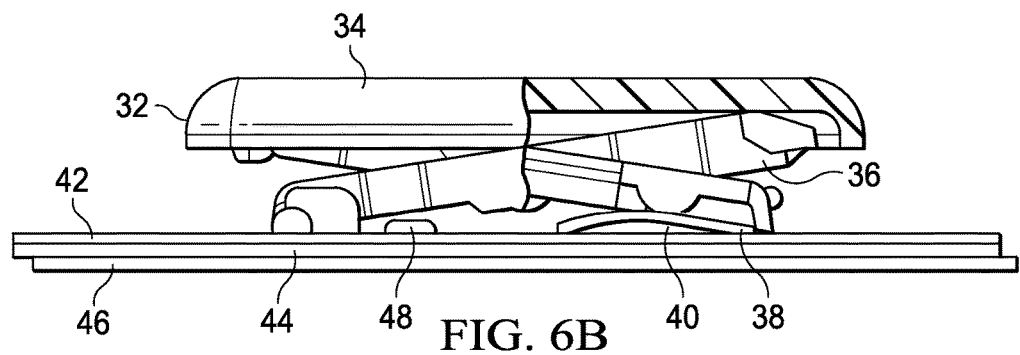
Figure 6C:
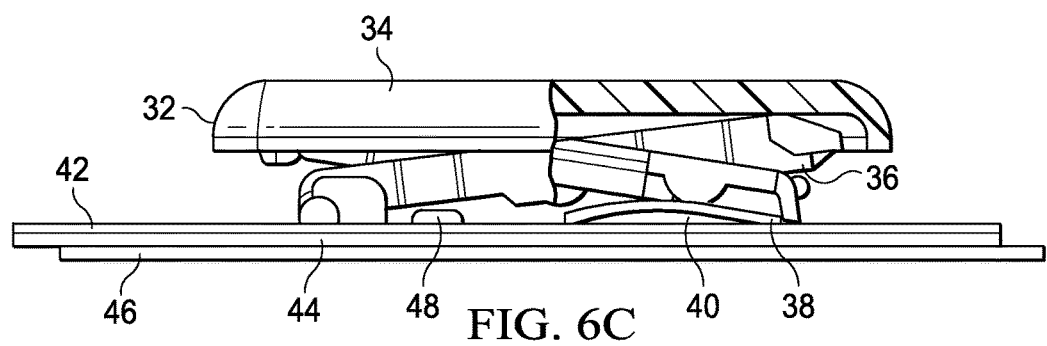
Figure 6D:
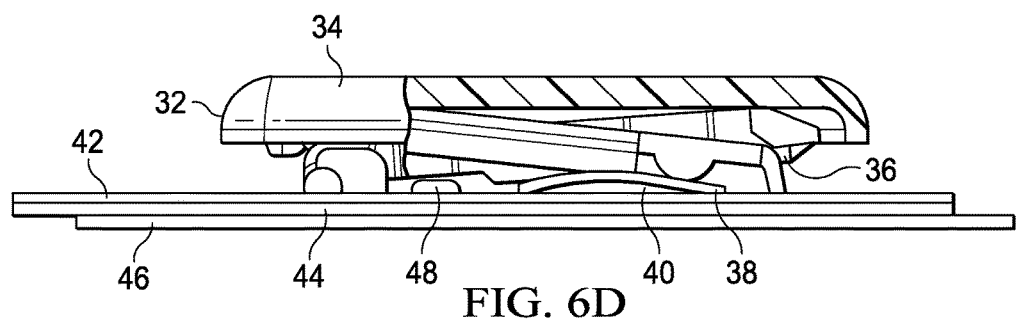
Figure 6E:
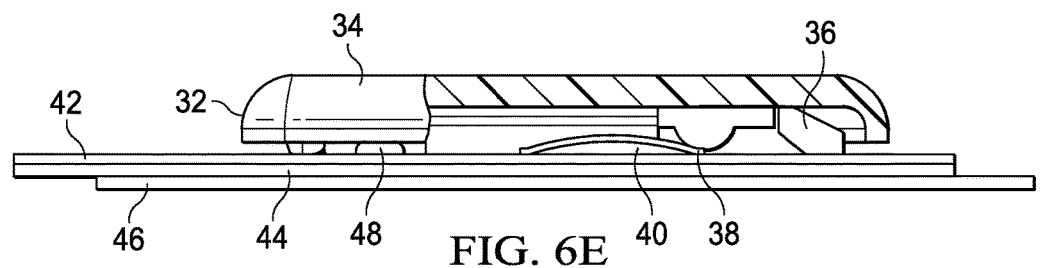

Referring now to FIGS. 6A through 6E, a side view depicts a keyboard key collapsing from an extended position biased upwards by a biasing device 40 to a retracted position having the biasing device 40 slid relative to the key. In the example embodiment, key cap 34 moves from a fully operational extended position held vertically by scissors structure 36 away from an input sensor membrane 42 (as depicted by FIG. 6A) to a fully retracted state with key 34 proximate input sensor membrane 42 as scissors structure 36 loses its upwards bias due to a sliding motion of 2 mm perpendicular to the key input motion axis (as depicted in FIG. 6E). In the fully extended position depicted by FIG. 6A, a metal popel dome 40 provides an upwards bias to key cap 34 by the interaction of dome 40's upper surface and a pressure point 38 extending downwards from scissors structure 36. User inputs are accepted at key 34 in the extended position by depressing pressure point 38 onto dome 40 and collapsing dome 40 so that its central portion presses on membrane 42 to establish a current representing a key input and readable by the keyboard controller. Once an end user removes pressure form key cap 34, dome 40 biases key cap 34 upwards by returning to its original shape and pressing upwards through pressure point 38. Membrane 42 is, for example, a conventional flexible membrane that generates a current when separate portions are pressed together; however, such conventional membranes deteriorate over time as the flexible portions are pressed together.

In order to lower key cap 34 to a retracted position without compressing membrane 42, a sliding bracket 44 slides membrane 42 and dome 40 relative to a bracket structure 46 that supports scissors structure 36. In FIG. 6B, initial motion of membrane 42 and sliding bracket 44 relative to bracket structure 46 is depicted with dome 40 coupled to and moving with membrane 42. Motion of sliding bracket 44 may be initiated by an end user placing an information handling system into a storage configuration, such as by translating motion to sliding bracket 44 of a lid housing portion rotating to a closed position relative to a main housing portion. As sliding bracket 44 slides relative to bracket structure 44, dome 40 slides from a position in alignment with pressure point 38 to a position out of alignment with pressure point 38. As depicted by FIGS. 6C and 6D, motion of dome 40 out of alignment with pressure point 38 removes upward bias to key cap 34 so that the weight of the key and scissors structure works to retract key cap 34 in a stored position proximate membrane 42 without pressing an input force onto membrane 42. In FIG. 6E, after a sliding motion of approximately 2 mm by membrane 42 and sliding bracket 44 relative to bracket structure 46, dome 40 is out of alignment with pressure point 38 so that key cap 34 fully retracts against membrane 42 without pressing membrane 42 to generate an input. A tab 48 extending upwards from sliding bracket 44 presses against scissors 36 to engage scissors 36 under a bracket that holds key cap 34 in the retracted position, as depicted by FIG. 6E. In one example embodiment, the force needed to slide bracket 44 for a full set of 86 keys in a keyboard is approximately 5% of the compressive force that would be applied to compress the 86 keys to a retracted position over an upward biasing device force applied at each key, such as when all 86 keys are biased upwards by a rubber dome fixed under each key.

Figure 7:
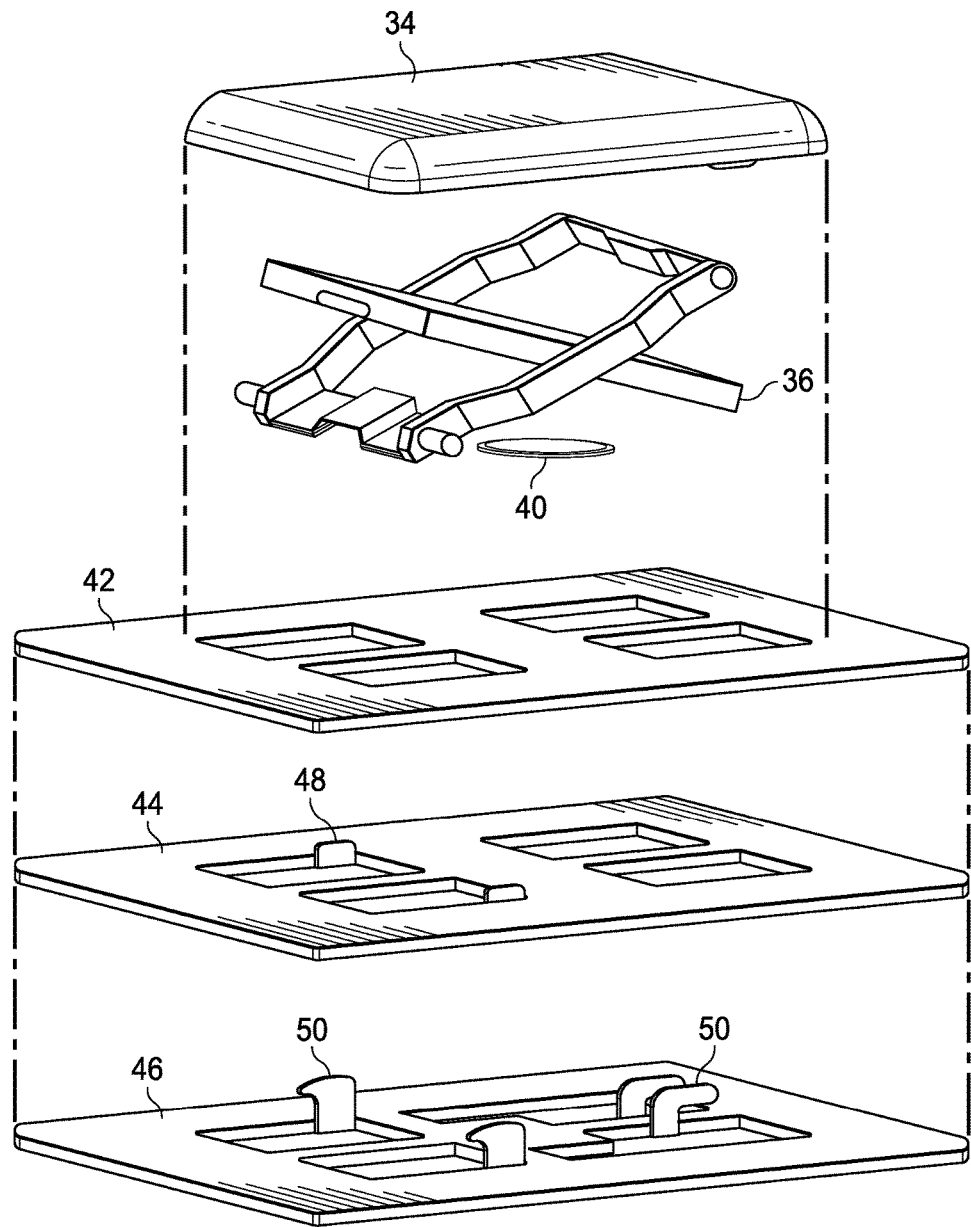
FIG. 7 depicts a side perspective blown-up view of a keyboard key having a sliding bracket mechanism to selectively remove upward bias from a key.

Referring now to FIG. 7, depicts a side perspective blown-up view of a keyboard key 32 having a sliding bracket mechanism 44 to selectively remove upward bias from a key cap 34. Metal dome 40 couples to membrane 42 over an input position so that pressure placed on metal dome 40 causes an input signal to be generated by membrane 42. Membrane 42 couples to sliding bracket 44 so that the assembly of metal dome 40 and membrane 42 can move with sliding bracket 44, such as in response to a force applied at tab 48. Bracket holder 50 rests under sliding bracket 44 with bracket holders 50 aligned through openings of sliding bracket 44 and membrane 42 to engage scissors 36. Bracket holder 50 maintains a constant position with one end of scissors 36 rotationally coupled in a fixed location and the opposing end of scissors 36 free to slide in a constrained area defined by brackets. Scissors 36 collapse when an input is made at key cap 34 to place an input force on metal dome 40, which is detected as an input by membrane 42. Sliding bracket 44 allows scissors 36 to collapse without making an input at membrane 42 by sliding dome 40 away from an alignment that translates inputs through dome 40 to membrane 42. Sliding bracket 44 advantageously reduces wear at membrane 42 by removing inputs to membrane 42 during storage of keys and also reduces the force needed to move keys to the retracted position by removing the biasing force that biases keys away from membrane 42. Although FIG. 7 depicts a metal dome 40 as the biasing device that is moved out of biasing alignment, in alternative embodiments, alternative biasing devices may be used and may be moved out of alignment from a biasing position in alternative directions and manners.

Figure 8:
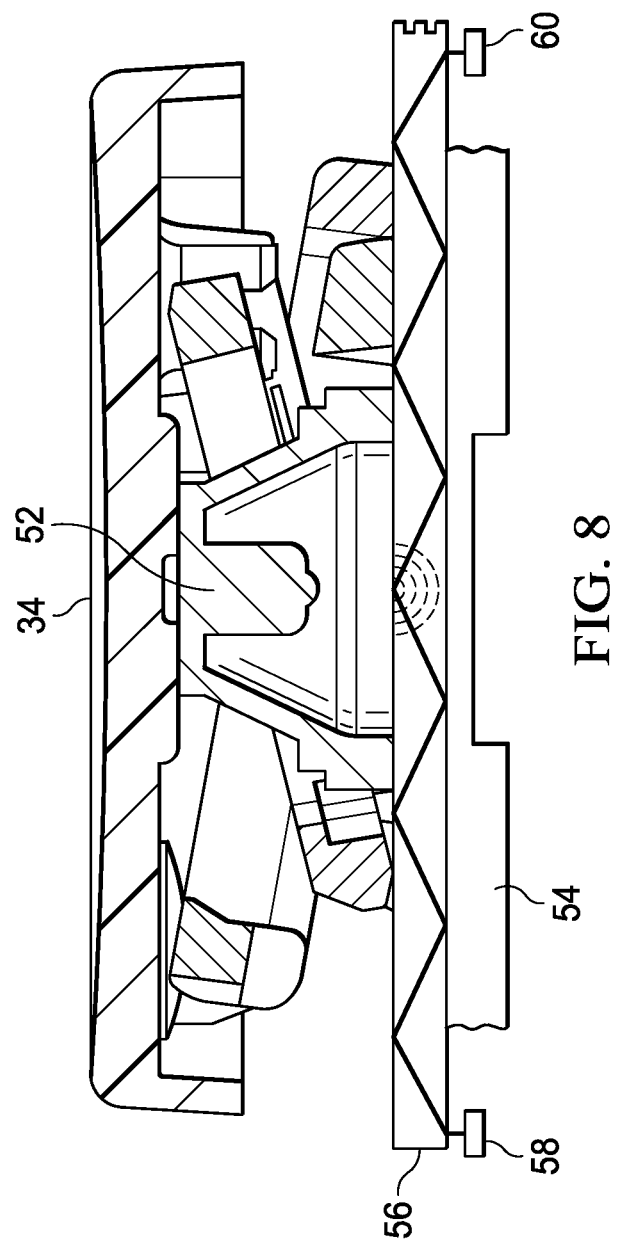
FIG. 8 depicts a side cutaway view of a keyboard key having a light emissive technology input detector with a rigid detection surface.

Referring now to FIG. 8, depicts a side cutaway view of a keyboard key cap 34 having a light emissive technology input detector 56 with a rigid detection surface. Although movement of a biasing device out of a biasing position reduces input stresses at a membrane surface, flexible membrane material may still have some residual forces applied by a key, such as retention forces that keep the key in a stored position, which can result in degradation of the flexible material over time. The light detection structure of light emissive technology input detector 56 further reduces the risk of input sensor degradation by providing input detection without requiring motion of the input sensor. In the example embodiment of FIG. 6, a conventional rubber dome 52 is used as a biasing device to maintain key cap 34 is a raised position relative to an input sensor surface 56. User inputs at key cap 34 translated through rubber dome 52 and against the rigid surface of light emissive technology input detector 56, where a change in light characteristics between light emitted by an emitter 58 and light detected at a detector 60 allows locating logic to determine the location of the key touch. As an example, light emissive technology input detector uses "total internal reflection" within a transparent medium to reflect light between emitter 58 and detector 60. Touches on the transparent medium surface causes disturbances in the reflected light so that advance signal processing can determine a touch location, such as touch detection firmware logic in the keyboard controller or other chipset components.

In the example embodiment of FIG. 8, a support plate 54 disposed beneath the transparent medium of light emissive technology input detector 56 provides support to ensure a rigid surface under rubber dome 52. A notch formed in support plate 54 provides for some deflection of support plate 54 in response to a press by rubber dome 52 so that a press at input detector 56 has an enhanced impact on reflected light to improve touch sensitivity. In one alternative embodiment, variable force level detection associated with a press by rubber dome 52 are detected to provide a distinction to a user for force level inputs at key presses, such as to determine if a key press is intended to indicate multiple inputs. A protective layer added on top of the transparent medium helps to reduce light disruption noise from normal keyboard usage stresses, such as lifting and dropping an information handling system, or placing palms on the keyboard rest. Light emissive technology input detector 56 replaces the flexible membrane of conventional keyboards with a rigid detection sensor surface so that compression of keys 34 into a retracted position, such as by pressing rubber domes 52 downward into an input position, will not deteriorate input sensitivity over time. In one embodiment, a movable biasing device replaces rubber dome 56 over light emissive technology input detector 56 so that reduced compressive force is needed to place keys 34 into a storage position. For example, a metal dome 40 placed on light emissive technology input detector 56 may move relative to an input position to reduce upward bias and improve compression to a storage position while also eliminating degradation of rubber parts associated with both a flexible membrane sensor and a rubber dome biasing device.

Figure 9A:
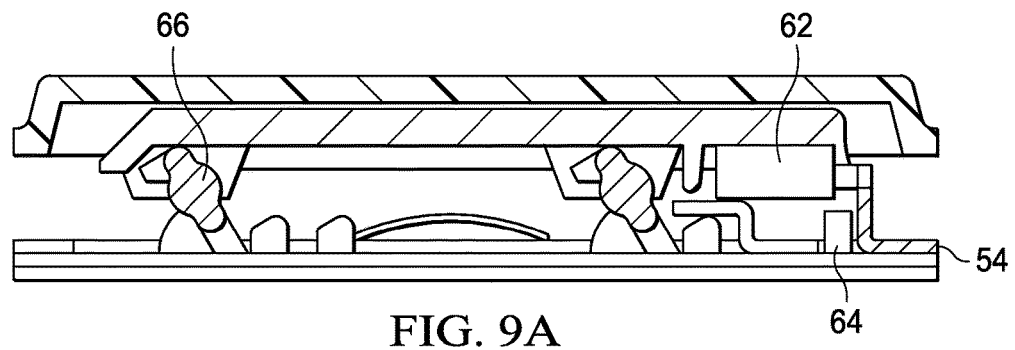
FIGS. 9A and 9B depict a keyboard key having a magnetic Hall switch input detector deployed on a rigid surface.
Figure 9B:
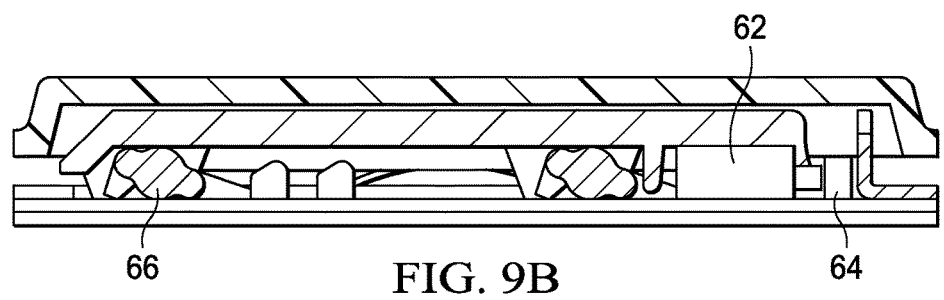

Referring now to FIGS. 9A and 9B, a keyboard key is depicted having a magnetic Hall switch input detector deployed on a rigid surface. In a raised position depicted by FIG. 7A, a rotating scissors mechanism 66 is biased upwards by a biasing device, such as a rubber dome 52. In the raised position, a magnet 62 is held distal a Hall sensor switch 64 disposed on a rigid support surface 54. A user press at key cap 34 as depicted by FIG. 9B presses the magnet 62 downwards into proximity of Hall switch 64, thus generating a current representative of an input. The magnet and Hall switch arrangement replaces the flexible membrane for detection of inputs to reduce the risk of failure due to degradation of rubber parts during key storage. In alternative embodiments, the magnet and Hall sensor arrangement may replace the metal dome and flexible membrane described above. In various embodiments, various combinations of input sensors and biasing devices may be used as desired to achieve selective compression of keys for storage within an information handling system without undesired degradation of flexible membrane and rubber dome biasing device components due to extended storage in the compressed stored states.

Although the present invention has been described in detail, it should be understood that various changes, substitutions and alterations can be made hereto without departing from the spirit and scope of the invention as defined by the appended claims.

What is claimed is:

1. A portable information handling system comprising:
   a housing;
   a processor disposed in the housing and operable to execute instructions to process information;
   a memory disposed in the housing and interfaced with the processor, the memory operable to store the information;
   a display disposed in the housing and interfaced with the processor and memory, the display operable to present the information as visual images;
   a keyboard disposed in the housing and interfaced with the processor, the keyboard having plural keys, each key generating an input by pressing downward against a contact location on a transparent medium supported by a support surface, the support surface having a thickness, the transparent medium having light emitted into it by an emitter and sensed by a sensor, each input detected by changes in light characteristics in the transparent medium, the support surface having a notch directly vertically aligned with each key contact location on the transparent medium, the support surface deflecting at the notch when a key presses on the transparent medium, the deflecting providing light characteristic changes in light passing through the transparent medium;
   a biasing device aligned with each key to bias the key distal the input detector; and
   a sliding structure associated with each key and operable to selectively alter alignment of the biasing device to establish a keyboard stored state having the keys retracted proximate the input detector.

2. The portable information handling system of claim 1 wherein the biasing device comprises a metal dome raised distal the input detector and configured to deflect in response to pressure by the associated key.

3. The portable information handling system of claim 2 further comprising:

a scissors structure coupled to each key to guide movement between key positions of distal and proximate the input detector; and a pressure point integrated with the key scissor and aligned with the metal dome to depress the metal dome in response to a key input.

4. A method for retracting a key into a portable information handling system housing, the method comprising:

biasing the key to a raised position away from an input detector with a biasing device aligned with a key support structure;

sliding the biasing device relative to the key support structure to remove the biasing; and moving the key towards the input detector in a storage position;

wherein the input detector comprises a transparent medium disposed over a support surface, the transparent medium integrating a light emissive touch detection having light emitted into the transparent medium by an emitter and sensed by a sensor to detect key inputs by changes in light characteristics, the support surface having a varied thickness that directly vertically aligns a less thick portion with each of one or more key touch locations on the transparent medium, the one or more less thick portions of the support surface having increased deflection in response to a given key press relative to more thick portions of the support surface.

5. The method of claim 4 further comprising:

retaining the key in the storage position with the sliding;

sliding the biasing device relative to the key support structure to re-establish the biasing; and in response to re-establishing the biasing, returning the key to the raised position away from the input detector.

6. The method of claim 5 wherein the biasing the key further comprises:

aligning a metal dome with a pressure point of the key support structure, the metal dome biasing the pressure point away from the input detector; and aligning a raised portion of the metal dome with an input portion of the input detector, the metal dome responding to pressure from the pressure point to bend and contact the input detector.

7. The method of claim 6 wherein the sliding the biasing device relative to the key support structure further comprises moving both the metal dome and the input detector relative to the pressure point.

* * * * *